USO11358057B2

(12) United States Patent
Smithers

(10) Patent No.: US 11,358,057 B2
(45) Date of Patent: Jun. 14, 2022

(54) SYSTEMS AND METHODS FOR ALLOWING INTERACTIVE BROADCAST STREAMED VIDEO FROM DYNAMIC CONTENT

(71) Applicant: Disney Enterprises, Inc., Burbank, CA (US)

(72) Inventor: Andi Smithers, Escondido, CA (US)

(73) Assignee: Disney Enterprises, Inc., Burbank, CA (US)

( * ) Notice: Subject to any disclaimer, the term of this patent is extended or adjusted under 35 U.S.C. 154(b) by 27 days.

(21) Appl. No.: 16/362,561

(22) Filed: Mar. 22, 2019

(65) Prior Publication Data
US 2020/0298113 A1 Sep. 24, 2020

(51) Int. Cl.
A63F 13/5255 (2014.01)
G06T 19/20 (2011.01)
G06T 3/00 (2006.01)
A63F 13/86 (2014.01)

(52) U.S. Cl.
CPC .......... A63F 13/5255 (2014.09); A63F 13/86 (2014.09); G06T 3/0087 (2013.01); G06T 19/20 (2013.01)

(58) Field of Classification Search
None
See application file for complete search history.

(56) References Cited

U.S. PATENT DOCUMENTS

| 9,998,664 B1* | 6/2018 | Long | G06T 3/005 |
| 2016/0287997 A1* | 10/2016 | Laakkonen | A63F 13/00 |
| 2017/0157512 A1* | 6/2017 | Long | A63F 13/86 |
| 2017/0270634 A1* | 9/2017 | Eggebrecht | G06T 15/205 |
| 2018/0077210 A1* | 3/2018 | Hannuksela | H04L 65/4092 |
| 2018/0192081 A1* | 7/2018 | Huang | H04N 13/117 |
| 2020/0134907 A1* | 4/2020 | Epstein | H04N 5/2226 |

OTHER PUBLICATIONS

Tom Clancy's Rainbow Six Siege by Ubisoft released Dec. 2015 (Year: 2015).*
Tom Clancy's Rainbow Six Siege—Spectator Mode Walkthrough [Europe] by Ubisoft published to (https://www.youtube.com/watch?v=sbuB-69euUw) on Aug. 5, 2015 (Year: 2015).*

* cited by examiner

Primary Examiner — James S. McClellan
Assistant Examiner — Peter J Iannuzzi
(74) Attorney, Agent, or Firm — Patterson + Sherdan, LLP

(57) ABSTRACT

Some implementations of the disclosure are directed to allowing interactive broadcast streamed video from games and other dynamic content. In accordance with some implementations, a content creator may publish a plurality of video surfaces of an environment for streaming to a plurality of client devices for video playback. The plurality of video surfaces may correspond, for example, to a cube map of a gaming environment captured from the perspective of a player. Upon receiving a stream including multiple video surfaces such as a cubemap, a media player of a viewer may generate a fully-rendered three-dimensional view of the environment.

20 Claims, 8 Drawing Sheets

SYSTEMS AND METHODS FOR ALLOWING INTERACTIVE BROADCAST STREAMED VIDEO FROM DYNAMIC CONTENT

DESCRIPTION OF THE RELATED ART

In recent years, there has been a proliferation of streaming services that livestream video content from a publisher to many viewers. One space where livestreaming of video content has become especially popular is the esports industry where gamers livestream their video game sessions to many thousands or even millions of viewers. In some present implementations of a livestream, video of the gamer (e.g., the gamer's face) is captured and overlaid over the video output of the video game environment displayed to the video game player during a video game session. The video output of the video game environment may be displayed by rendering scene objects into multiple textures and then generating a final view that is displayed to the gamer by applying the rendered textures to the main scene. This composite video is then streamed to viewers.

Although video game livestreaming services allow for some limited level of interaction with other viewers (e.g., through a chat room) while viewing the livestream composite video, a viewer may feel a lack of interaction because the user may only "look" at the composite video of the stream. For example, as the viewer is limited to looking at the same view of the video game environment as the player, the viewer may be unable to view items, objects, or characters that are just off camera or behind the player that the viewer may be aware of when looking at a streaming broadcast. As such, it would be advantageous if viewers of a stream could do more than simply look at the video stream.

Current implementations for making available more than a 2D video view of a livestream are limited. For example, although there exists dedicated 3D camera hardware to capture light fields (e.g., intensity and direction of light rays) of a real-world environment, such implementations may be very data intensive, which may be impractical for streaming environments. Additionally, in such implementations, the viewer of the stream may still be limited to the view provided by the publisher of the content. Further, the use of 3D camera hardware to capture light fields is not an option that is available in video game environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the present disclosure to the precise form disclosed.

DETAILED DESCRIPTION

As used herein, the term "video surface" generally refers to a resource to store an image for rendering or display purposes. A video surface may be a frame buffer, a depth buffer, a render target buffer, a surface buffer, a 2D texture, or a 3D texture volume.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

As used herein, the term "virtual reality" or "VR" generally refers to a simulation of a user's presence in an environment, real or imaginary, such that the user may interact with it.

Various implementations of the disclosure are directed to allowing interactive broadcast streamed video from games and other dynamic content. In accordance with particular implementations, a content creator may publish a plurality of video surfaces for streaming to a plurality of client devices for video playback. The plurality of video surfaces may correspond, for example, to a cube map of a gaming environment captured from the perspective of a player. By virtue of receiving a stream including multiple video surfaces such as a cubemap, a media player of a viewer may be configured to generate a fully-rendered three-dimensional view of the gaming environment. This may permit a viewer to pan, tilt, or zoom around the environment, thereby adding an additional level of interaction to the viewing experience. Further, implementations described herein may be less data intensive than existing methods of capturing 3D video, which may require dedicated 3D camera hardware to capture data-intensive light fields. Additionally, by virtue of implementations described herein, a video player may use existing video surfaces already used as part of a scene composition in a renderer (e.g., game engine renderer), which may provide light overhead on the renderer used on the content publishing side.

Figure 1:
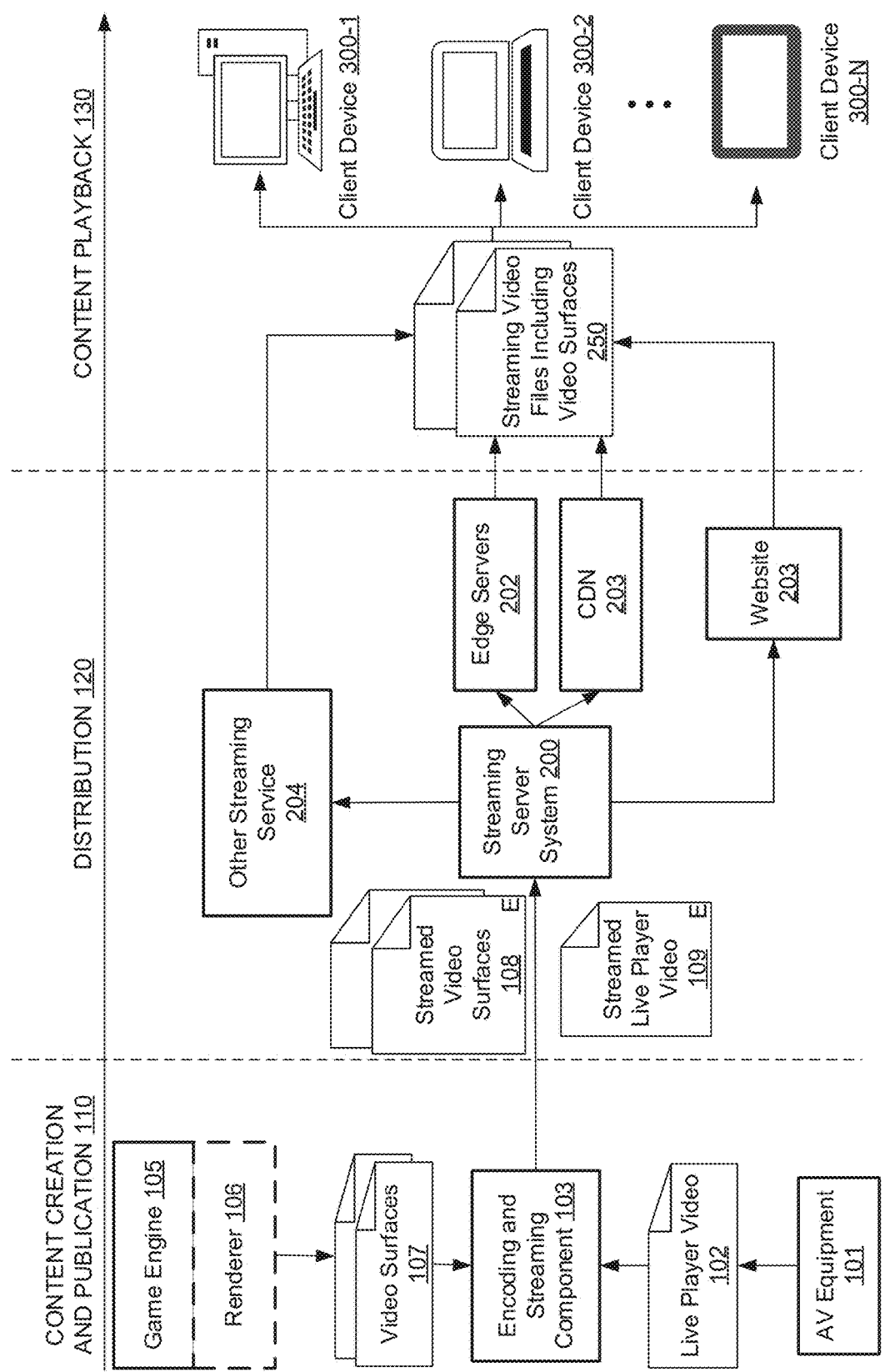
FIG. 1 illustrates an example video game streaming environment in which the disclosure may be implemented.

FIG. 1 illustrates an example video content streaming environment in which implementations of the disclosure may be implemented to allow for interaction with livestreamed video. In this example environment, there are three stages: a video content creation and publication stage 110, a video content distribution stage 120, and a video content playback stage 130.

During content creation and publication stage 110, a live event, such as live streaming of a video game player may be captured using audiovisual equipment 101 and game engine 105. Audiovisual equipment 101 may include a camera and audio source such as a microphone connected to a mixer. It may capture live player video 102 showing the player playing the video game. The player may be positioned in front of a green screen such that the captured live player video 102 may be encoded (e.g., using encoding and streaming component 103) to omit the background. In alternative implementations, capture of live player video 102 may be omitted from the pipeline.

Game engine 105 may be loaded with scenes, animated characters, and other content. Once content is created in the game engine, video (e.g., camera footage) from any point of view in the game engine may be rendered by game engine renderer 106 and streamed out as video surfaces files. The videos captured from each point of view may be simultaneously captured. In particular implementations, the plurality of video surfaces 107 may correspond to the six surfaces of a cube map captured from the point of view of the video game player in the video game environment. For example, a cube map may be captured as a collection of six images, each representing a face or surface along the six different directions of the axes of a world (e.g., left, right, up, down, forward, back). As such, during video streaming, the six image frames of a cube map corresponding to a point of view of the video game player may be streamed by game engine 105.

Figure 2:
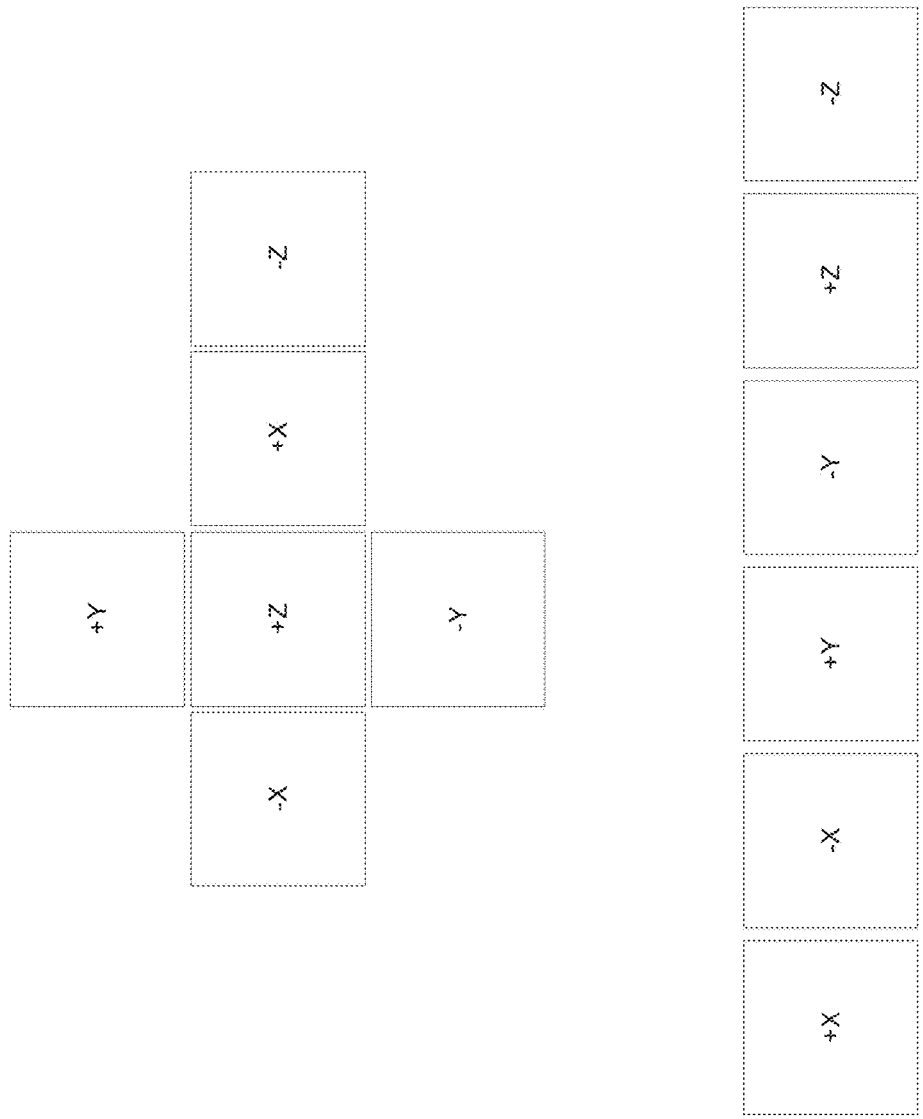
FIG. 2 illustrates cube map layouts in accordance with implementations of the disclosure.

In some implementations, depth information, including depth surfaces generated with each surface in the cube map may also be streamed, allowing for more interactive compositions in real time. FIG. 2 illustrates example configurations of cube map layouts that may be used in accordance with implementations of the disclosure. As illustrated, each face of the cube map may correspond to a positive or negative direction of one of the three cartesian axes (i.e., +X, −X, +Y, −Y, +Z, −Z). In the illustrated example, a vertical cross layout of cube map faces and vertical column of cube map faces are shown. However, it should be appreciated that, depending on the implementation (e.g., game engine), any suitable cube map layout may be utilized. For example, a horizontal cross layout of cube map faces, a column of cube map faces, a spherical environment map of cube map faces, a latitude-longitude layout of cube map faces, or some other suitable layout may be utilized.

Although implementations described herein will be primarily described in the context of video surfaces that correspond to a cube map of an environment, it should be appreciated that implementations described herein may apply to other livestreaming contexts where a plurality of video surfaces are made available to a viewer on a client device such that the viewer may interact with the video stream (e.g., by panning around a 3D environment, by switching between the different views provided by the different streamed video surfaces, etc.) For example, in other implementations, video surfaces that correspond to a cube map of the environment may be streamed from some other point of view. As another example, video surfaces captured from multiple points of view may be made available in a video stream.

Additionally, although the illustrated example of FIG. 1 shows an environment for livestreaming of video game video content (e.g., during an esports broadcast) in which a renderer 106 of a game engine 105 renders multiple video surfaces 107, it should be appreciated that the implementations described herein may apply to other environments in which a plurality of video surfaces are livestreamed to a video player of a client device 300. For example, in some implementations a plurality of video surfaces corresponding to a VR view of a real-world environment may be livestreamed. In such implementations, the video surfaces may be captured using one or more cameras (e.g., omnidirectional cameras) in a real-world environment. For example, a cube map of six video surfaces may be created by using one or more cameras in the real-world environment to capture panoramic video in the real-world environment.

For example, consider live sporting events that typically layer augmentations (e.g., line markers, circles, etc.) on top of the actual field of play. By streaming depth surfaces generated with each image, an end user of a client device 300 may be provided with a similar capability, including the option of dynamically drawing on top of streamed images by obeying the depth field specified in the streamed depth information associated with the depth surfaces.

Following capture of multiple video surfaces 107 and live player video 102, an encoding and streaming component 103 may be utilized to encode and stream the captured video files as streamed video surfaces 108 and streamed live player video 109.

By way of illustrative example, a video surface stream may include, among other things, the following stream header information:

[ID]
[Content Author]
[Creation Date]
[Content Definition Chunk]
   [Compression Type]
   [Bandwidth Sizing]
   [Number of surfaces(n)]
   [Surface types[(n)]]
[Per Frame Definition]
   [Type (full or delta)]
   [Surface ID offset[(n)]]

Depending on the implementation, the encoder of streaming component 103 may be a software encoder running on a desktop computer or other device, a hardware encoder (e.g., specifically designed encoding hardware with web interface), an IP camera, a browser (e.g., using WebRTC to use a browser to capture and push video content), or some combination thereof. In some implementations, encoding and streaming component 103 may assemble live player video 102 using audio captured from a microphone and video captured from a camera.

Encoding and streaming component 103 may use any suitable protocol to stream the captured video content to a streaming server system 200. For example, in some implementations, encoded video surfaces 108 and encoded live player video 109 may be streamed in accordance with an HTTP live streaming (HLS) protocol, a real-time messaging protocol (RMTP), or some other protocol. Component 103 may be configured to connect to a live streaming server using a suitable port, username, password, etc.

For livestreams, encoding and streaming component 103 may include a media stream segmenter component or some other component to break the encoded video files into segments that are streamed to a streaming server system 200. The segmenter may also create and maintain an index file containing list of segmented files. The index file may be made available on the streaming server system 200, or the streaming server may contain a pointer (e.g., URL of index file).

As further described below, by virtue of pushing a cube map or other video surfaces (and optionally, an audiovisual feed of the player) as a video source rather than a final output (e.g., video game video of player overlaid with audiovisual feed of player), an environment renderer of the entire visual system may be effectively sent as part of a streamed broadcast.

Figure 3:
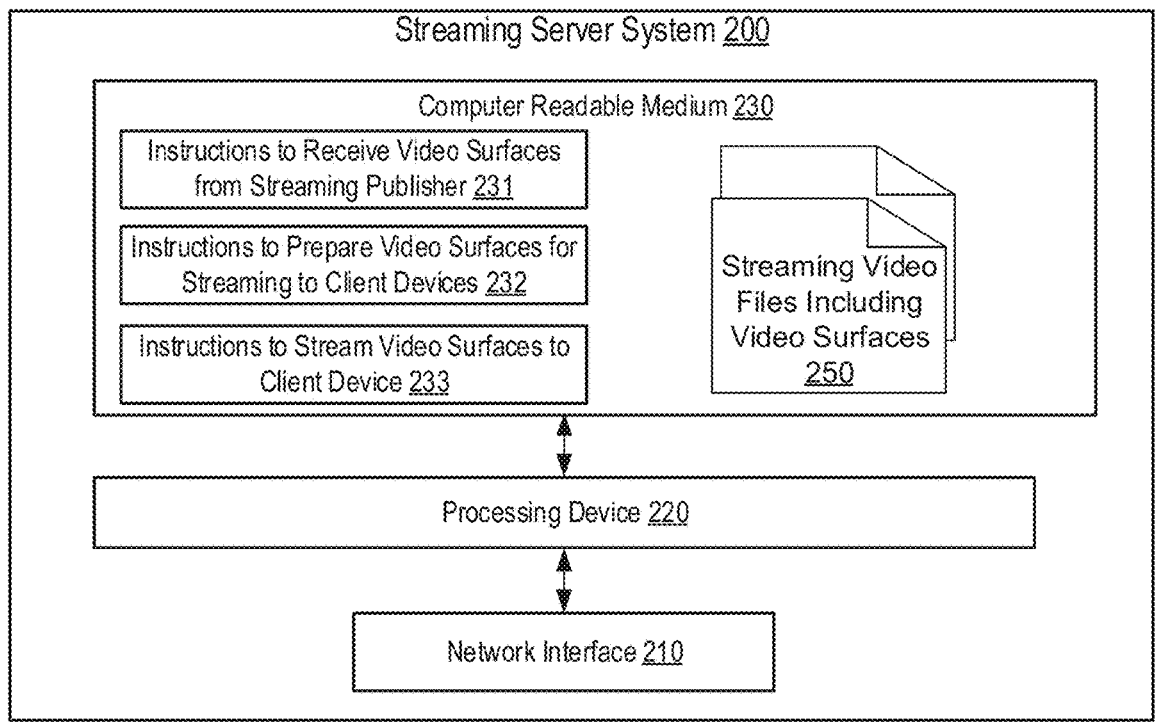
FIG. 3 is a block diagram illustrating an example architecture of components of the streaming server system of FIG. 1, in accordance with implementations of the disclosure.

With reference now to the video content distribution stage 120, a streaming server system 200 may be utilized to livestream the video surfaces (and live player video) for playback by one or more client devices 300-1, 300-2, . . . , and 300-N (individually referred to as a "client device 300"). FIG. 3 is a block diagram illustrating an example architecture of components of streaming server system 200, in accordance with implementations of the disclosure. As shown, streaming server system 200 may include a network interface 210, processing device 220, and computer readable medium 230.

Network interface 210 may be configured to receive streamed video surfaces 108 and streamed live player video 109 over a wired or wireless communication network using a suitable communication protocol. Additionally, network interface 230 may be configured to communicate with other systems (e.g., edge servers, content delivery network servers, servers of other streaming services, etc.) of distribution stage 210 to make streaming video files including video surfaces 250 available to a client device 200. Network interface 230 may be implemented as a network interface controller, or some other suitable network interface for performing the aforementioned functions.

Computer readable medium 230 may store one or more instructions that may be executed by a processing device 220 to perform functions in accordance with implementations of the disclosure. For example, computer readable medium 230 may be configured to store instructions 231 for receiving video surface files from a streaming publisher, instructions 232 to prepare video surface files for streaming to client devices 232, and instructions 233 to stream video surface files to client devices 233. Additionally, computer readable medium 230 may store streaming video files including video surface files 250.

During operation, streaming server system 200 may be configured to ingest encoded video surfaces 108 and encoded live player video 109 using a suitable connection protocol (e.g., RTMP protocol), and prepare video files (e.g. files 250) for streaming to client devices 300. For example, in some implementations, streaming server system 200 may take an incoming stream of multiple video surfaces 108 and create a plurality of streams of the multiple video surfaces 108 at multiple bitrates that can be delivered in multiple resolutions to client devices 300. In implementations where the video surfaces 108 comprise a cube map, multiple bitrate versions of the cube map may be created for streaming.

In some implementations, streaming server system 200 may also be configured to create multiple formats of the multiple video surfaces 108. For example, streaming server system 200 may transcode a received cube map into multiple formats to allow for playback on various players that support the different formats.

As illustrated by FIG. 1, streaming server system 200 may make streaming video files including video surfaces 250 available for playback by client devices. In some implementations, streaming server system 200 may utilize a plurality of edge servers 201 located in different geographic regions (e.g., where the majority of viewers are located), and streaming server system 200 may act as an origin server for streaming. In some implementations, streaming server system 200 may rely on a content delivery network (CDN) 202 to stream video files including video surfaces 250. For example, a CDN service such as AZURE, CLOUDFRONT, GOOGLE CLOUD, and the like may be used to host or distribute video files using a network of edge servers.

In some implementations, streaming server system 200 may utilize a website 203 to distribute streaming video files including video surfaces 250. For example, a media player may be embedded on the website to playback files 250. In some implementations, streaming server system 200 may restream files 108, 109 to another streaming service 204 (e.g., YOUTUBE, TWITCH, FACEBOOK LIVE, etc.) for streaming to client devices 300.

Figure 4:
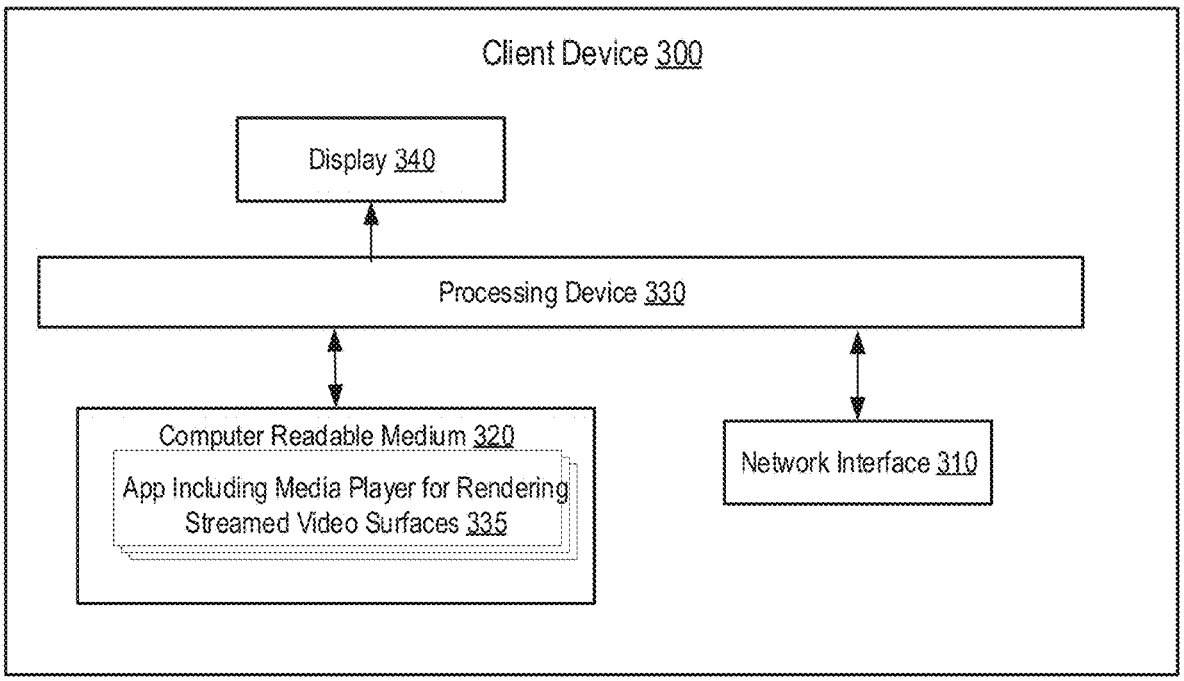
FIG. 4 is a block diagram illustrating an example architecture of components of the client device of FIG. 1, in accordance with implementations of the disclosure.

With reference now to the content playback stage 130, a plurality of client devices 300 may playback the streaming video files include video surfaces 250. A client device 300 may be any user device configured to render a plurality of streamed video surfaces using a media player. For example, a client device 300 may be implemented using a laptop, a tablet, a smartphone, a videogame console, a smart TV, a desktop computer, or some other suitable device. FIG. 4 is a block diagram illustrating an example architecture of components of a client device 300, in accordance with implementations of the disclosure. As shown, a client device 300 may include a network interface 310, a computer readable medium 320, a processing device 330, and a display 340.

Network interface 310 may be configured to receive streaming media files including video surfaces 250 over a wired or wireless communication network. For example, media content files 250 may be accessed by a client device 300 from an edge server closest to the client device 300 or using a website 203 hosted by a web server. Network interface 320 may be implemented as a network interface controller, a cellular transceiver, or some other suitable network interface for receiving files 250.

Computer readable medium 320 may store an application 335 that includes a media player for rendering streamed video surfaces 335. The application 335 may be implemented as a set of one or more instructions that are executable by a processing device 330 for playback of streaming video files including video surfaces 250. For example, the application 335 may provide a graphical user interface that is displayed by display 340. The graphical user interface may display video content and include controls for modifying the video content that is displayed. For example, as further described below, the controls may permit a user of the client device to select video surfaces of a streaming video file that are displayed, to select between a three-dimensional rendering and a standard two-dimensional rendering of video, or to select other functions. In some implementations, application 335 may be a component of a web browser utilized by client device 300.

Figure 5:
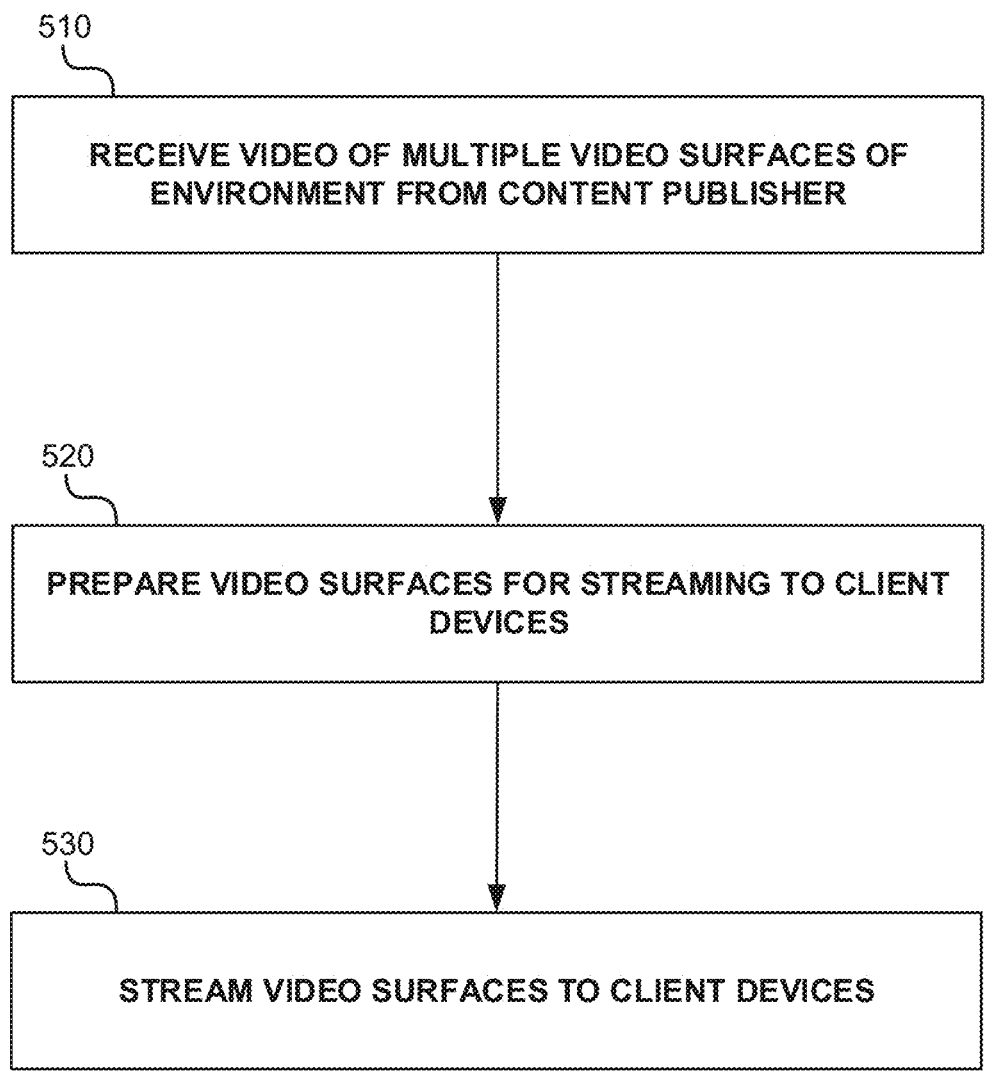
FIG. 5 is an operational flow diagram illustrating an example method that may be implemented using a streaming server system to distribute streaming video including multiple video surfaces, in accordance with implementations of the disclosure.

FIG. 5 is an operational flow diagram illustrating an example method 500 that may be implemented using a streaming server system 200 to distribute streaming video in accordance with implementations of the disclosure. At operation 510, a video including multiple video surfaces of an environment is received from a content publisher. The environment may comprise a video game scene, a real-world scene, or some other scene for which the content publisher captured multiple video surfaces. The received video may be received as part of a livestream. In such implementations, the video may be received in segments (e.g., 5 second segments, 10 second segments, 30 second segments, 1 minute segments, 2 minute segments, 5 minute segments, etc.). Each of the received segments, may be received in chronological order of publication. The multiple video surfaces of the received video may include six video surfaces forming a cube map of a scene (e.g., cubemap of video game scene). In some implementations, video of the content publisher (e.g., video game player) may be received along with the multiple video surfaces of the environment.

At operation 520, the multiple video surfaces are prepared for streaming to multiple client devices. The multiple video surfaces may be prepared for streaming by creating a plurality of bitrate versions of each of the video surfaces, creating a variety of different video formats of each of the video surfaces (e.g., for video player compatibility or for data compression), or performing some other function that modifies or creates a new version of the multiple video surfaces received from the content publisher. In implementations where video of the content publisher (e.g., video of the video game player) is also received, the video of the content publisher may also be prepared for streaming in a similar manner.

At operation 530, the video surfaces are streamed to the multiple client devices. For example, the plurality of bitrate versions of the multiple video surfaces may be streamed to the multiple client devices. In some implementations, the video surfaces streamed to the multiple client devices may include multiple bitrate versions of a cubemap of a scene. In implementations where video of the content publisher (e.g., video game player) is also captured, the video of the content publisher may be streamed along with the video surfaces (e.g., cube map).

Figure 6:
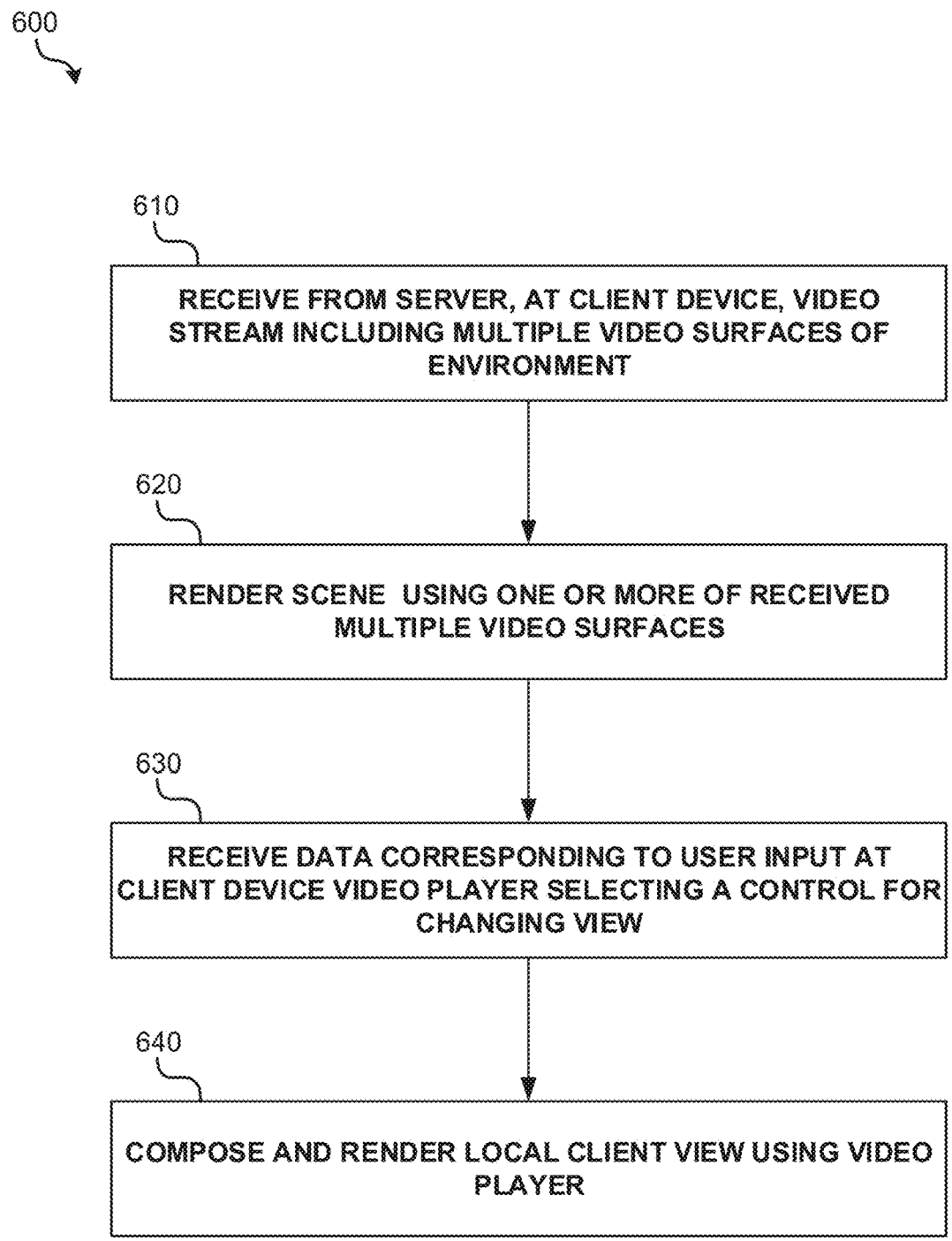
FIG. 6 is an operational flow diagram illustrating an example method 600 that may be implemented by a client device 300 to play back video content including multiple video surfaces, in accordance with implementations of the disclosure.

FIG. 6 is an operational flow diagram illustrating an example method 600 that may be implemented by a client device 300 to play back video content including multiple video surfaces, in accordance with implementations of the disclosure. For example method 600 may be implemented by a client device running an application 335 including a media player for rendering streamed video surfaces 335.

At operation 610, the client device 300 receives, from a server, a video stream including multiple video surfaces associated with an environment or scene. The multiple video surfaces may be associated with a video game environment (e.g., captured from the point of view of the game player) or with a real-world environment (e.g., captured using multiple cameras in a real-world environment). In particular implementations, the plurality of video surfaces comprise six video surfaces forming a cube map of a scene.

In implementations, the received video stream may be a livestream or broadcast of an ongoing event. In such implementations, the video may be received in segments (e.g., 5 second segments, 10 second segments, 30 second segments, 1 minute segments, 2 minute segments, 5 minute segments, etc.). Each of the received segments, may be received in chronological order of publication. Alternatively, the received video stream may be a past broadcast that was archived (e.g., in a file server of a CDN).

In video game environment implementations, the client device 300 may also receive a video stream providing a video or audiovisual feed of a video game player playing the video game. The video stream of the video game player, in some implementations, may be received part of the video stream including the multiple video surfaces associated with the environment.

In some implementations, the received video stream may include depth information, including depth surfaces. For example depth surfaces generated with each image in a cube map may be received.

In response to receiving the video stream, at operation 620, the client device may render a view of the video stream using one or more of the received multiple video surfaces. The media player of the client device may render a three-dimensional view of the environment using the multiple video surfaces received with the video stream. For example, in implementations where six video surfaces corresponding to a cube map are received, the cubemap may be dynamically composed by submitting the six video surfaces to a renderer (e.g., a renderer of the video player). In some implementations, a source texture, defined as a cubemap of six images, may be generated, and the renderer may be used to generate an image. In other implementations, a dynamic surface buffer that is six video surfaces configured as a cubemap may be received, and an image may be directly transferred to the six surfaces.

The rendered three-dimensional view of the environment may be rendered as part of a virtual reality display that allows the user to pan, tilt, or zoom around a three-dimensional representation of an environment. The media player of the client device may also or alternatively render a two-dimensional view of the environment using one of the multiple video surfaces received with video surface. For example, in implementations where a cube map is received, one of the faces of the cube map may be rendered.

In the particular example of a video game environment, the rendered view may include a two-dimensional or three-dimensional view of the video game environment that is overlaid with an audiovisual feed of the video game player playing the video game.

At operation 630, data is received that corresponds to user input at the client device video player selecting a control for changing the view of the video stream that is displayed. In some implementations, the control may be a control for panning or zooming around a displayed three-dimensional scene. In other implementations, the control may be a control for changing the type of view that is rendered. For example, the viewer may select a control for rendering a three-dimensional view of the environment using the multiple video surfaces received with the video stream. Alternatively the viewer may select a control for rendering a two-dimensional view of the environment using one of the multiple video surfaces received with the video stream. In video game environments where a video feed of a video game player is overlaid over a view of the environment, a control may also be provided for toggling the video feed of the video game player on and off.

At operation 640, in response to receiving the data, a local client view may be composed and rendered using the video player. For example, a zoom, tilt, or pan function may be performed for a three-dimensional view (e.g., by altering a view matrix corresponding to the three-dimensional view in response to the zoom, tilt, or pan function), a two-dimensional view may replace a three-dimensional view, a three-dimensional view may replace a two-dimensional view, additional video surfaces of the video stream that were not displayed may be displayed, video surfaces of the video surface that were displayed may be toggled off, or some other change to the video may be made in response to receiving the data.

Figure 7:
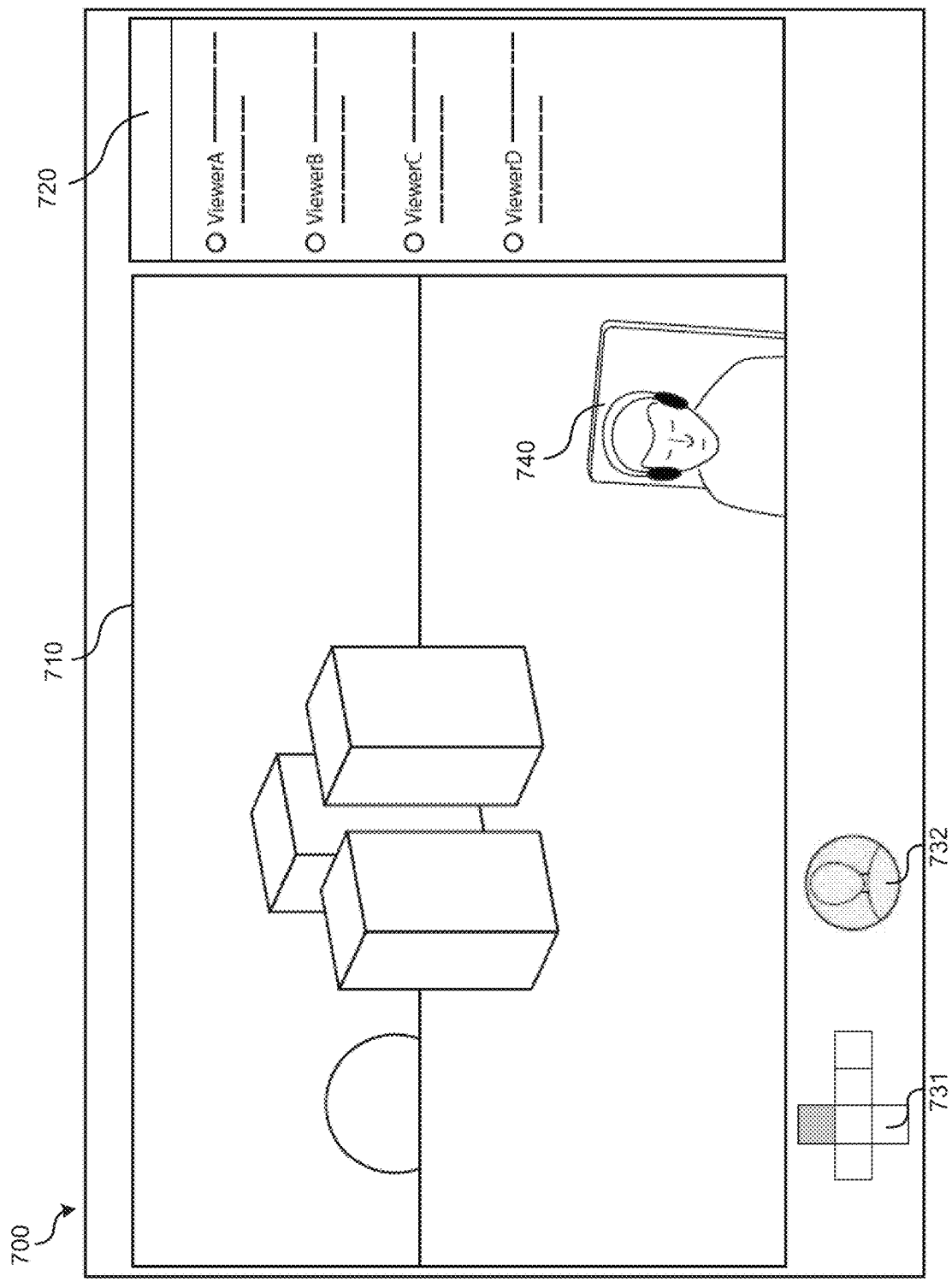
FIG. 7 illustrates an example graphical user interface that may be presented at a media player of a client device to present interactive livestreamed video, in accordance with implementations of the disclosure.

FIG. 7 illustrates an example graphical user interface 700 that may be presented at a media player of a client device to present interactive livestreamed video, in accordance with implementations of the disclosure. In this particular example, the livestreamed video includes video of a videogame environment that is overlaid with a video feed 740 of the video game player. The graphical user interface 700 may include a display area 710 for displayed video content, a chat box or area 720 for chatting with other viewers of the livestream, and controls 731 and 732 for changing the view of the livestream that is presented to the viewer. It should be appreciated that, depending on the implementation, additional controls may be provided to the user of the media player for changing the presented view or making other changes within the graphical user interface.

In the example of FIG. 7, control 731 may be actuated to transition between a rendered cube map view and a two-dimensional (2D) view of the video stream (e.g., as would normally be displayed as part of a videogame livestream). The rendered 2D view may be presented to the viewer by displaying a front face of a cube map received in a video stream. In the example of FIG. 7, the control is set such that area 710 displays a conventional 2D view. Control 732 may be actuated to toggle the video feed 740 of the video game player on and off.

Figure 8:
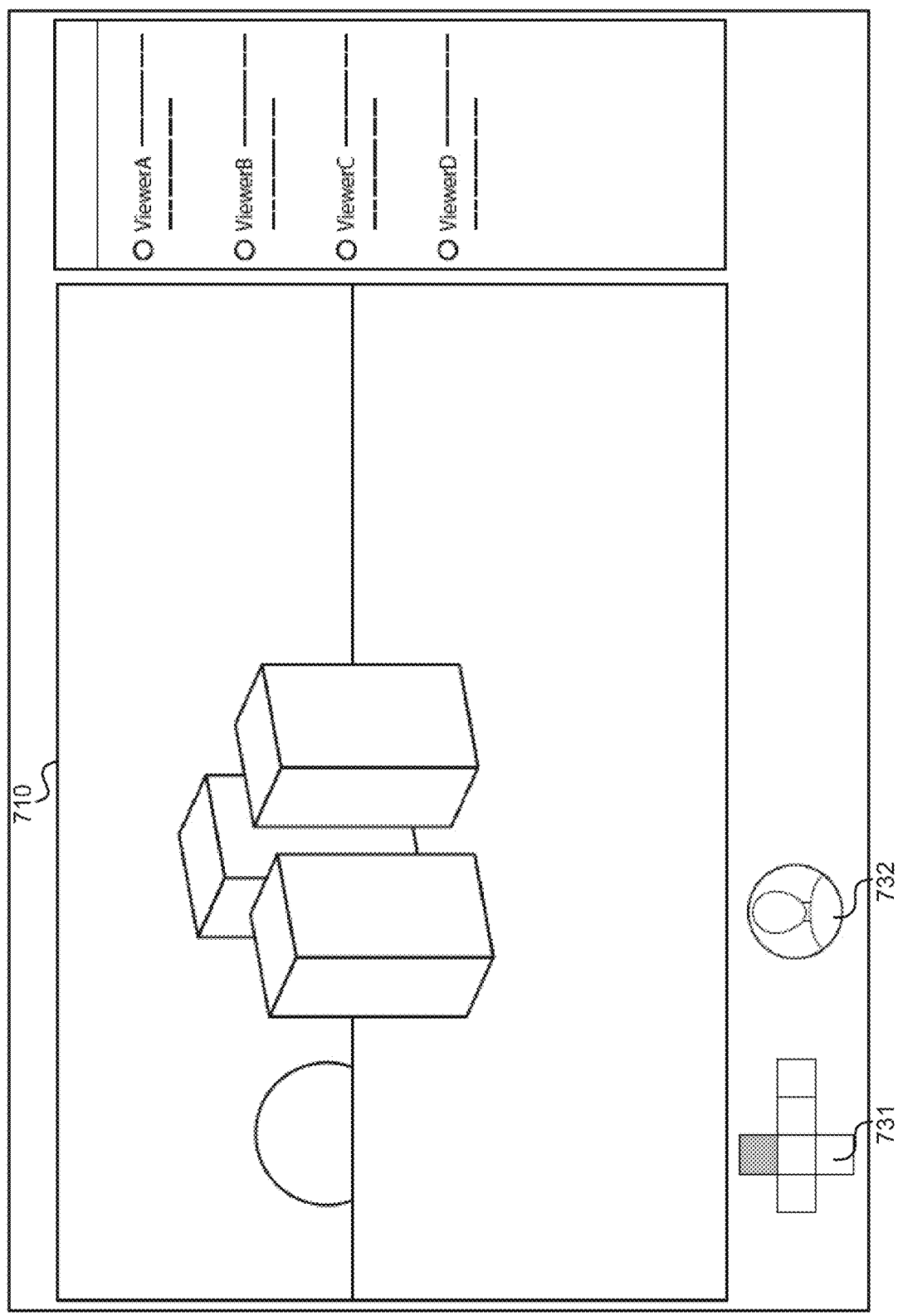
FIG. 8 illustrates the graphical user interface of FIG. 7 after the user selects a control for hiding an overlay video of the video game player.
Figure 9:
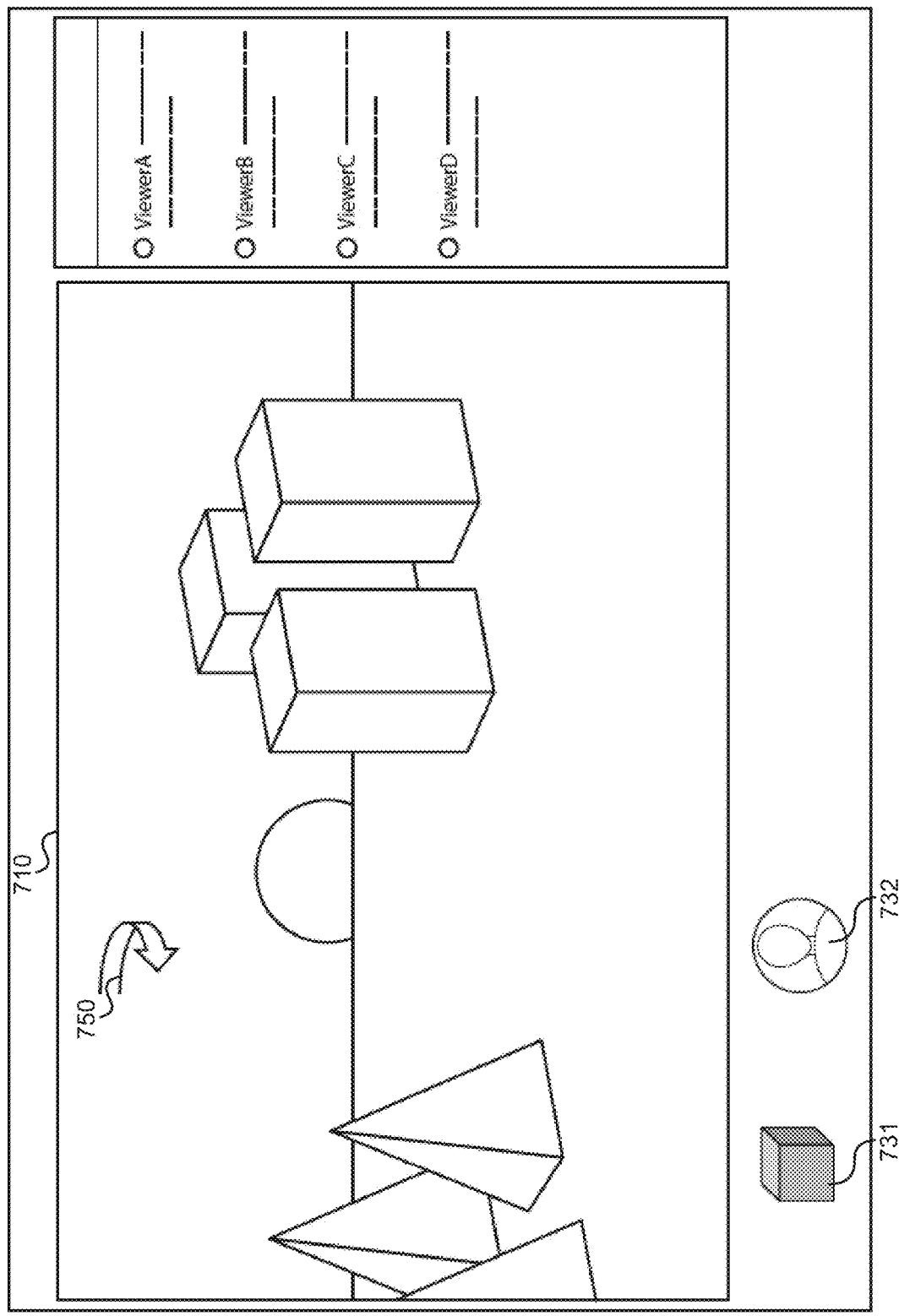
FIG. 9 illustrates the graphical user interface of FIG. 8 after the user selects a control for displaying a three-dimensional view of the livestream video.

FIG. 8 illustrates the graphical user interface of FIG. 7 after the user toggles control 732. After toggling control 732, the video feed 740 of the video game player is hidden from view. FIG. 9 illustrates the graphical user interface of FIG. 8 after the user toggles control 731 such that area 710 displays a rendered cube map to provide a 3D view. As illustrated, in the 3D view the user may perform a pan function (illustrated by rotating arrow 750) in the video game environment.

As illustrated by the foregoing discussion, by virtue of implementing the systems and methods described herein, including streaming video surfaces to a video player that renders the video surfaces, an individual who does not own a copy of a videogame may still navigate and manipulate the video game environment to some extent. For example, an individual receiving a livestream including video surfaces of a videogame environment may change the camera view in the video game environment, including panning, tilting, or zooming around the video game environment. Additionally, an individual may select from multiple camera views in the video game environment to render.

In this document, the terms "machine readable medium," "computer readable medium," and similar terms are used to generally refer to non-transitory mediums, volatile or non-volatile, that store data or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized or general-purpose processors that perform processing operations. A processing device may include a CPU, GPU, APU, DSP, FPGA, ASIC, SOC, or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having executable instructions stored thereon, that when executed by a processor, cause a system to:
receive, from a server and over a communication network, a video stream including a plurality of video surfaces forming a cube map, the plurality of video surfaces captured from a point of view of a character in a virtual environment, the video stream further including a plurality of depth surfaces corresponding to the plurality of video surfaces, the plurality of video surfaces comprising:
a first video surface oriented in a front direction from the character and comprising a view controlled or selected by a generator of the video stream; and
a second video surface different from the first video surface and oriented along a direction that (i) extends radially outward from the character and (ii) is different from the front direction;
render, at a video player, a first view of the virtual environment using the first and second video surfaces; and
receive user input at the video player selecting a second view of the virtual environment to render and in response, render the second view of the virtual environment using the first video surface but not the second video surface and present the second view instead of the first view.

2. The non-transitory computer readable medium of claim 1, wherein the instructions, when executed by the processor, further cause the system to:
receive data corresponding to user input at the video player panning, tilting, or zooming the first view of the virtual environment; and
in response to receiving the data, panning, tilting, or zooming the first view of the virtual environment.

3. The non-transitory computer readable medium of claim 1, wherein, the virtual environment comprises a video game scene of a video game played by a video game player, wherein the cube map comprises a cube map of the video game scene.

4. The non-transitory computer readable medium of claim 3, wherein the instructions, when executed by the processor, further cause the system to:
receive over the communication network from the server, a video feed of the video game player; and
overlaying the video feed of the video game player over the first view.

5. The non-transitory computer readable medium of claim 1, wherein the video stream received from the server comprises a livestream.

6. The non-transitory computer readable medium of claim 1, wherein the video stream received from the server comprises a livestream, wherein receiving the video stream comprises receiving a plurality of bit rate versions of the plurality of video surfaces of the virtual environment, and wherein rendering the first view comprises using one of the plurality of bit rate versions of the plurality of video surfaces to render the first view.

7. The non-transitory computer readable medium of claim 1, wherein the video stream is sent from the generator to the server over the communication network, wherein the view is controlled or selected by the generator based on user input received locally at the generator.

8. The non-transitory computer readable medium of claim 7, wherein the instructions, when executed by the processor, further cause the system to:
receive, at the video player, user input specifying to draw an augmentation to the first view and in response, layering, at the video player, the augmentation atop the first view according to a depth field specified in the depth surfaces corresponding to the first and second video surfaces.

9. The non-transitory computer readable medium of claim 8, wherein the virtual environment comprises a video game scene of a video game played by a video game player, wherein the video game executes locally at the generator, wherein the cube map comprises a cube map of the video game scene.

10. The non-transitory computer readable medium of claim 9, wherein the instructions, when executed by the processor, further cause the system to:
receive over the communication network from the server, a video feed of the video game player; and
overlaying the video feed of the video game player over the first view.

11. The non-transitory computer readable medium of claim 10, wherein the instructions, when executed by the processor, further cause the system to:
receive data corresponding to user input at the video player panning, tilting, or zooming the first view of the virtual environment; and
in response to receiving the data, panning, tilting, or zooming the first view of the virtual environment.

12. The non-transitory computer readable medium of claim 11, wherein the video stream received from the server comprises a livestream, wherein receiving the video stream comprises receiving a plurality of bit rate versions of the plurality of video surfaces of the virtual environment, and wherein rendering the first view comprises using one of the plurality of bit rate versions of the plurality of video surfaces to render the first view.

13. The non-transitory computer readable medium of claim 12, wherein the plurality of video surfaces are rendered based on the video game scene, wherein the video game scene is created in a game engine of the video game, wherein the video stream and video feed are encoded as part of a single stream.

14. A non-transitory computer readable medium having executable instructions stored thereon, that when executed by a processor, cause a system to:
create a plurality of video surfaces by simultaneously capturing each of a plurality of videos from a point of view of a character in a virtual environment, wherein each of the plurality of videos corresponds to one of the plurality of video surfaces, wherein the plurality of video surfaces comprises (1) a first video surface oriented in a front direction from the character and comprising a view controlled or selected, and (2) a second video surface different from the first video surface and oriented along a direction that (i) extends radially outward from the character and (ii) is different from the front direction;
encode a video stream comprising the plurality of video surfaces forming a cube map and further comprising a plurality of depth surfaces corresponding to the plurality of video surfaces; and
livestream the encoded video stream to a content distribution system that makes the video stream available over a communication network, wherein the encoded video stream is configured such that it is capable of being rendered by a client device to:
- render a first view of the virtual environment using the first and second video surfaces; and
- receive user input at the client device selecting a second view of the virtual environment to render and in response, render the second view of the virtual environment using the first video surface but not the second video surface and present the second view instead of the first view.

15. The non-transitory computer readable medium of claim 14, wherein creating the plurality of video surfaces comprises:
- creating a video game scene in a game engine; and
- after creating the video game scene in the game engine, rendering each of the plurality of videos of the video game scene.

16. The non-transitory computer readable medium of claim 15, wherein the instructions, when executed by the processor, further cause the system to: capture a video stream of a player controlling the character, wherein encoding the video stream comprises encoding the video stream comprising the plurality of video surfaces and the video stream of the player.

17. The non-transitory computer readable medium of claim 15, wherein the plurality of video surfaces includes depth information corresponding to each video surface of the plurality of video surfaces, wherein the instructions, when executed by the processor, further cause the system to generate the depth information.

18. A method, comprising:
- receiving, over a communication network, a video stream of a plurality of video surfaces forming a cube map, the plurality of video surfaces captured from a point of view of a character in a virtual environment, the video stream further including a plurality of depth surfaces corresponding to the plurality of video surfaces, the plurality of video surfaces comprising (1) a first video surface oriented in a front direction from the character and comprising a view controlled or selected by a generator of the video stream and (2) a second video surface different from the first video surface and oriented along a direction that (i) extends radially outward from the character and (ii) is different from the front direction;
- preparing the plurality of video surfaces for streaming to a plurality of client devices; and
- after preparing the plurality of video surfaces, streaming over the communication network the plurality of video surfaces to the plurality of client devices, wherein the plurality of video surfaces are configured such that they are capable of being rendered by the plurality of client devices to:
  - render a first view of the virtual environment using the first and second video surfaces; and
  - receive user input selecting a second view of the virtual environment to render and in response, render the second view of the virtual environment using the first video surface but not the second video surface and present the second view instead of the first view.

19. The method of claim 18, further comprising:
- receiving, over the communication network, a video feed of a content publisher of the video stream;
- preparing the video feed of the content publisher for streaming to the plurality of client devices; and
- streaming the video feed of the content publisher to the plurality of client devices, wherein the video feed of the content publisher is streamed with the cube map.

20. The method of claim 19, wherein, the virtual environment comprises a video game scene, wherein the cube map comprises a cube map of the video game scene.

* * * * *